(12) United States Patent (10) Patent No.: US 7,782,933 B2
MacDonald et al. (45) Date of Patent: Aug. 24, 2010

(54) DIGITAL SUBSCRIBER LINE DIAGNOSTIC SYSTEM

(76) Inventors: Alistair Malcolm MacDonald, 4866 Sherbrook Dr., Oldsmar, FL (US) 34677; Joseph Q. Chapman, 9040 Baywood Park Dr., Seminole, FL (US) 33777

( * ) Notice: Subject to any disclaimer, the term of this patent is extended or adjusted under 35 U.S.C. 154(b) by 783 days.

(21) Appl. No.: 11/467,967

(22) Filed: Aug. 29, 2006

(65) Prior Publication Data

US 2007/0071177 A1 Mar. 29, 2007

Related U.S. Application Data

(60) Continuation of application No. 10/409,260, filed on Apr. 8, 2003, now Pat. No. 7,106,834, which is a division of application No. 09/851,457, filed on May 8, 2001, now Pat. No. 6,574,308.

(51) Int. Cl.
*H04B 17/00* (2006.01)

(52) U.S. Cl. .................................................. 375/224

(58) Field of Classification Search ................. 375/224, 375/222; 379/1.04, 22.04, 24, 93.01
See application file for complete search history.

(56) References Cited

U.S. PATENT DOCUMENTS

| | | | |
|---|---|---|---|
| 4,351,059 A | 9/1982 | Gregoire et al. | |
| 4,374,436 A | 2/1983 | Armstrong | |
| 4,385,384 A * | 5/1983 | Rosbury et al. | ............. 714/717 |
| 4,385,392 A | 5/1983 | Angell et al. | |
| 4,398,299 A | 8/1983 | Darling et al. | |
| 4,558,317 A | 12/1985 | Armstrong | |
| 5,321,722 A | 6/1994 | Ogawa | |
| 5,400,322 A | 3/1995 | Hunt et al. | |
| 5,602,902 A | 2/1997 | Satterlund et al. | |
| 5,627,501 A | 5/1997 | Biran et al. | |
| 5,778,024 A | 7/1998 | McDonough | |
| 5,793,413 A | 8/1998 | Hylton et al. | |
| 6,002,671 A | 12/1999 | Kahkoska et al. | |
| 6,014,425 A | 1/2000 | Bingel et al. | |
| 6,023,470 A | 2/2000 | Lee et al. | |
| 6,091,713 A | 7/2000 | Lechleider et al. | |
| 6,154,524 A | 11/2000 | Bremer | |
| 6,177,801 B1 | 1/2001 | Chong | |
| 6,181,775 B1 | 1/2001 | Bella | |
| 6,219,378 B1 | 4/2001 | Wu | |
| 6,266,348 B1 | 7/2001 | Gross et al. | |
| 6,282,265 B1 | 8/2001 | Lowell et al. | |

(Continued)

OTHER PUBLICATIONS

"Multicarrier Modulartion for Data Transmission: An Idea Whose Time Has Come" by John A.C. Bingham, Published May 19990 in IEEE Communications Magazine.

(Continued)

*Primary Examiner*—Khai Tran

(57) ABSTRACT

A communication device transmits very low frequency signals in order to help diagnose the cause of a communication problem in a DSL communication system. The communication problem may be, for example, the inability of a remote data transceiver unit (DTU-R) to successfully train-up with a central data transceiver unit (DTU-C). The very low frequency signals may be used to communicate the status or settings of the remote transceiver unit to the DTU-C, to download settings parameters or executable code to the DTU-R, or to coordinate the transmission of testing signals.

45 Claims, 9 Drawing Sheets

U.S. PATENT DOCUMENTS

| | | |
|---|---|---|
| 6,292,468 B1 | 9/2001 | Sanderson |
| 6,345,071 B1 | 2/2002 | Hamdi |
| 6,366,644 B1 | 4/2002 | Sisk et al. |
| 6,400,803 B1 | 6/2002 | Tate et al. |
| 6,424,820 B1 * | 7/2002 | Burdick et al. ............. 455/41.1 |
| 6,456,694 B1 | 9/2002 | Posthuma |
| 6,574,308 B1 | 6/2003 | Macdonald et al. |
| 6,584,148 B1 | 6/2003 | Zitting et al. |
| 6,606,372 B2 | 8/2003 | Yi et al. |
| 6,760,333 B1 | 7/2004 | Moody et al. |
| 6,788,705 B1 | 9/2004 | Rango |
| 6,885,730 B1 | 4/2005 | Bremer |
| 7,106,834 B2 | 9/2006 | Macdonald et al. |
| 2001/0048716 A1 | 12/2001 | Gough et al. |
| 2004/0202237 A1 * | 10/2004 | Krinsky et al. .............. 375/222 |

OTHER PUBLICATIONS

"Is Remote Deployment Cure or Killer for DSL?" by Tom Kovanic, EE Times, Apr. 23, 2001, 3 pages.

* cited by examiner

DIGITAL SUBSCRIBER LINE DIAGNOSTIC SYSTEM

CROSS REFERENCE TO RELATED APPLICATION

This application is a continuation of U.S. patent application Ser. No. 10/409,260, filed Apr. 8, 2003, which is a continuation of U.S. Pat. No. 6,574,308, issued Jun. 3, 2003, all of which are herein incorporated by reference.

FIELD OF THE INVENTION

The present invention relates generally to the field of telecommunication, and more particularly to digital subscriber line (DSL) communication systems.

BACKGROUND OF THE INVENTION

With the explosion in the growth of Internet usage among both businesses and households, telephone companies have been pressured to provide affordable, high bandwidth access that will support high-speed multimedia services, such as video on demand, high speed Internet access, and video conferencing. To meet this demand, telephone companies are increasingly turning to xDSL technology. The xDSL technology, while having several different embodiments, can provide throughput rates over 100 times faster than that available through traditional 56 kbps modems. The following are some of the xDSL technologies that are either available today or are currently being tested on a trial basis: Asymmetric Digital Subscriber Line (ADSL), which has a throughput of 32 kbps to 8.192 Mbps downstream to the customer and 32 kbps to 1.088 Mbps upstream to the network; Rate Adaptive Asymmetric Digital Subscriber Line (RADSL), which is a rate adaptive variation of ADSL; High-bit-rate Digital Subscriber Line (HDSL), which offers full duplex throughput at T1 (1.544 Mbps) or E1 (2.048 Mbps) data rates; Symmetric Digital Subscriber Line (SDSL), which provides bi-directional throughput at data rates ranging from 160 Kbps-2.084 Mbps; and Very high-bit-rate Digital Subscriber Line (VDSL), which provides high data rates for customers close to the central office (e.g., 51 Mbps for subscribers within 1000 feet). But most importantly, xDSL technologies offer these high data rates over a standard copper telephone line.

In order for a remote DSL modem to function properly, it is necessary for it to conduct a training session, or to train-up, with a central DSL modem. Training-up is a technique for adjusting modem settings based on current telephone line conditions and involves the transmission of a special training sequence to a remote modem. Upon receiving the special training sequence, the remote modem calculates the distortion effects of the subscriber line and compensates accordingly for line conditions. If a train-up is unsuccessful, the endpoint customer has practically no means of knowing why the modem is not working. As a result, a communications service provider often finds it necessary to send a technician to the customer's premises in order to determine the cause of the problem.

Sending a technician to a customer's premises is often referred to as a "truck roll." Communications service providers strive to reduce the number of truck rolls because there are significant costs associated with them. These costs may involve, for example, maintaining trucks, technicians, hand-held test equipment, etc. Furthermore, truck rolls can be time consuming and may therefore be inconvenient for customers who will experience an interruption in DSL services while the cause of the problem is being diagnosed. Therefore, there exists a need for a faster and more efficient system and method for determining the cause of a communication problem in a DSL communication system.

SUMMARY OF THE INVENTION

In one embodiment of the invention, a communication device transmits very low frequency signals in order to help diagnose the cause of a communication problem in a DSL communication system. In another embodiment of the invention, a communication device transmits very low frequency signals in order to help improve the performance of a DSL communication system. In yet another embodiment of the invention, very low frequency signals are used to help with the installation and/or configuration of a DSL modem.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
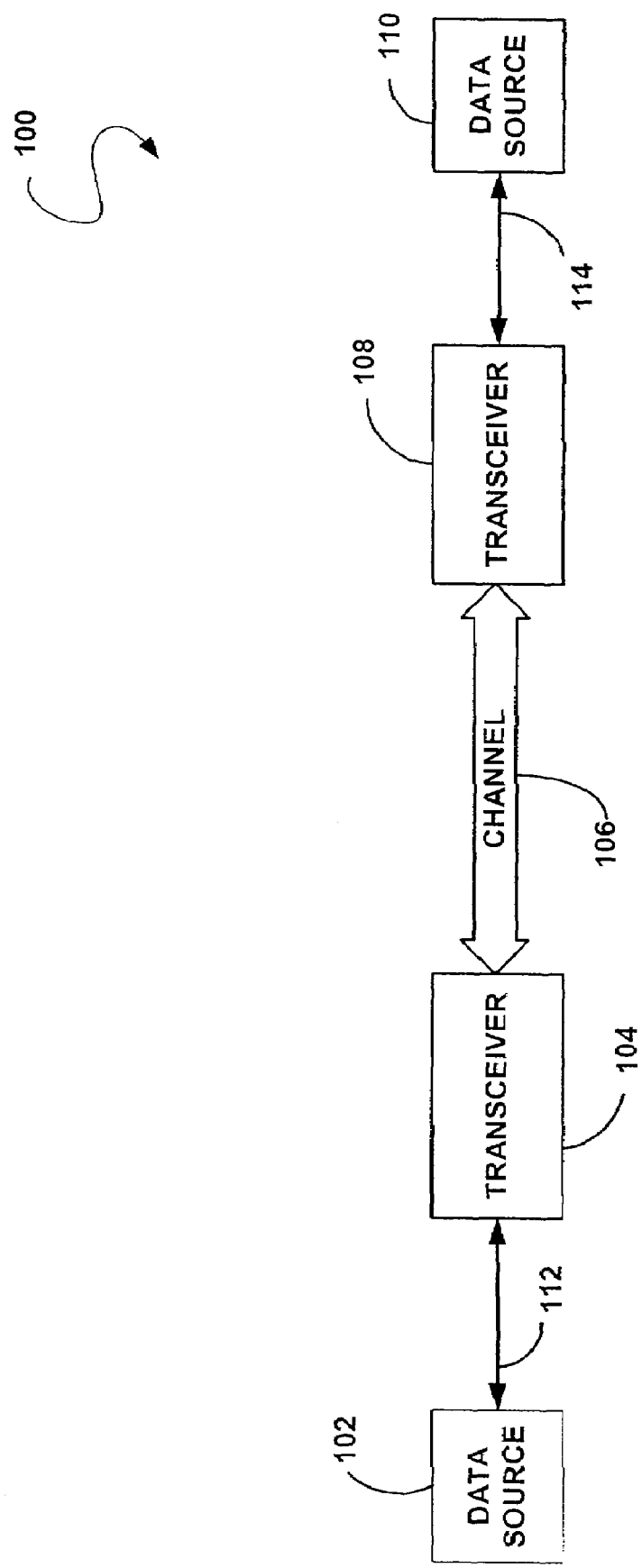
FIG. 1 is a block diagram illustrating one possible configuration of a communication system in which an embodiment of the present invention may be implemented.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

I. System Overview

FIG. 1 is a block diagram illustrating one possible configuration of a communication system 100 in which the present invention may be implemented. Communication system 100 includes a data source 102, a transceiver 104, a communication channel 106, a transceiver 108, and a data source 110. Data source 102 is coupled to transceiver 104 via connection 112, and data source 110 is coupled to transceiver 108 via connection 114. Transceivers 104 and 108 are coupled together via channel 106, which may be a wired connection or a wireless connection.

Communication system 100 is bidirectional in that data may be transmitted in a downstream direction from data source 102 to data source 110 or in the upstream direction from data source 110 to data source 102. For example, in the downstream direction, data source 102 provides a message signal to transceiver 104 via connection 112. Transceiver 104 transforms the message signal into a form compatible with communication system 100 and suitable for transmission over channel 106. The transmitted signal is received by transceiver 108. Transceiver 108 reconstructs the original message signal from the received signal and provides it to data source 110 via connection 114. In the upstream direction, data source 110 provides a message signal to transceiver 108 via connection 114. Transceiver 108 transforms the message signal into a form compatible with communication system 100 and suitable for transmission over channel 106. The transmitted signal is received by transceiver 104. Transceiver 104 reconstructs the original message signal from the received signal and provides it to data source 102 via connection 112.

Figure 2:
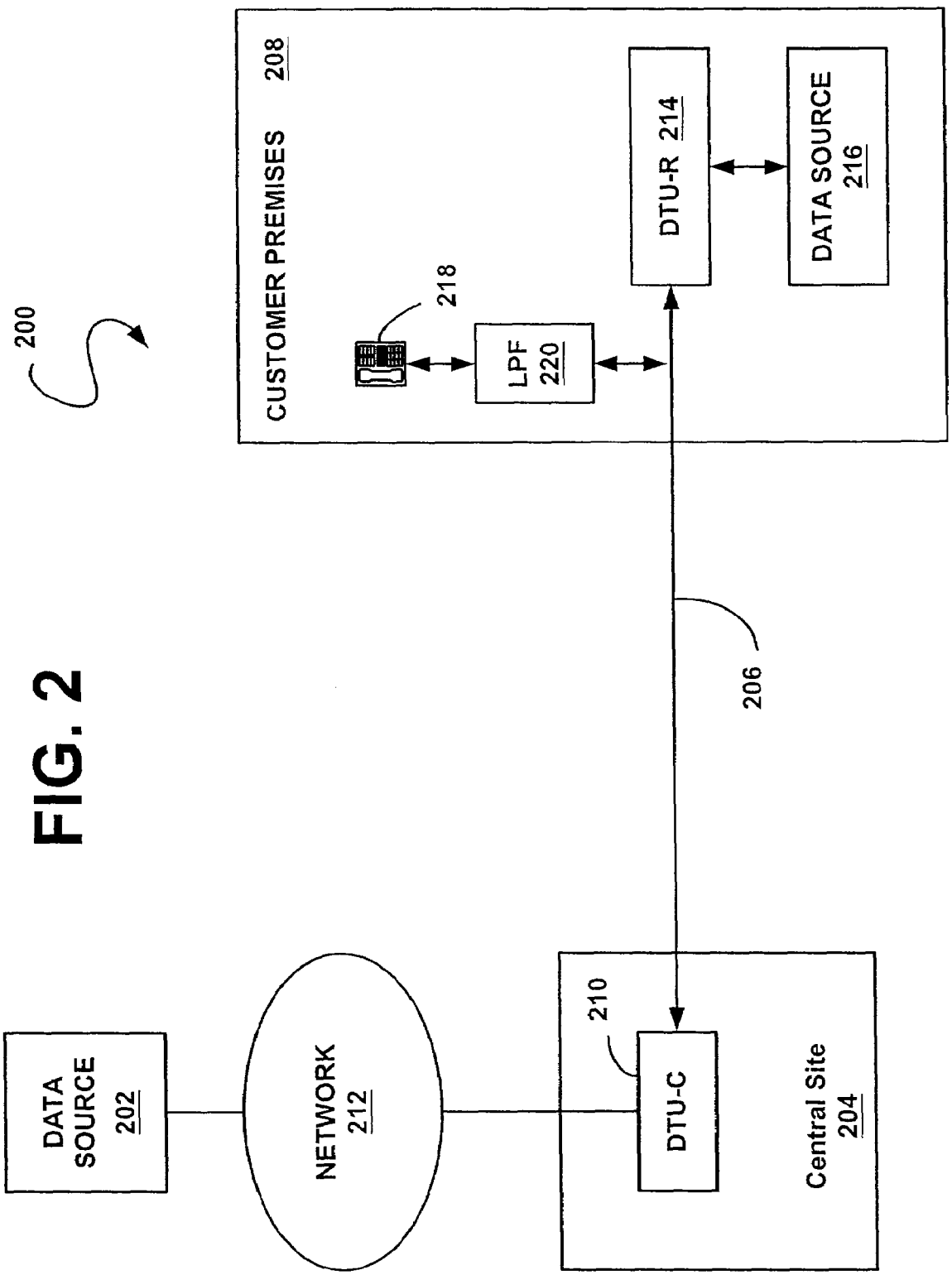
FIG. 2 is a block diagram illustrating another possible configuration of a communication system in which an embodiment of the present invention may be implemented.

FIG. 2 is a block diagram illustrating an exemplary communication system 200 in which an embodiment of the present invention may be implemented. Communication system 200 includes a data source 202, a data source 216, a central site 204, a communication channel 206, a network 212, and a customer premises 208. Communication channel 206 may be a copper wire pair for delivering DSL and telephone services. Such a communication channel is commonly referred to as a "local loop," or a "subscriber loop." Customer premises 208 includes a remote data transceiver unit (DTU-R) 214 and data source 216, whereas central site 204 includes a central data transceiver unit (DTU-C) 210. Data source 216 is capable of communicating with data source 202 with the help of data transceiver units 210 and 214. Each data source may be, for example, a personal computer (PC), a lap-top computer, or some other data processing device.

DTU-C 210 is coupled to data source 202 via a network 212 and to DTU-R 214 via channel 206. Network 212 may be, for example, the Internet, an asynchronous transfer mode (ATM) network, or some other data communication network. Customer premises 208 may also include a plain old telephone service (POTS) device 218. The POTS device 218 communicates using voice-band frequency signals and may be, for example, a telephone or a fax machine. A low pass filter 220 is typically installed between communication channel 206 and POTS device 218 to prevent DSL signals from interfering with POTS signals. In an alternative embodiment, the DTU-R 214 and the POTS device 218 interface with communication channel 206 via a splitter (not shown) so that POTS signals and DSL signals do not interfere with each other.

According to one embodiment of the present invention, DTU-C 210 is capable of communicating with DTU-R 214 using a DSL technology (xDSL), such as, for example, an asynchronous digital subscriber line (ADSL) technology. However, it is or will be apparent to those of ordinary skill in the art, that the systems and methods of the present invention may be employed in communication systems using other xDSL technologies such as, for example, high bit rate DSL (HDSL), symmetric DSL (SDSL), multi-rate SDSL (MS-DSL), rate adaptive DSL (RADSL), and other current or future xDSL technologies. Furthermore, it is or will be apparent to those of ordinary skill in the art, that the systems and methods of the present invention may be employed in other communication systems that do not use xDSL technologies.

Figure 3C:
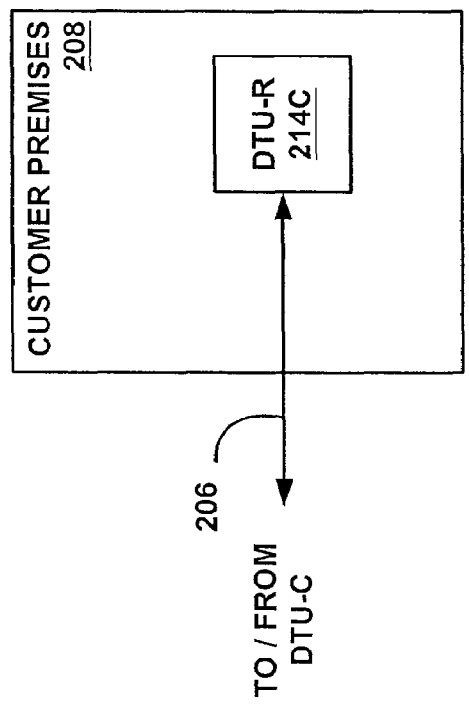
FIG. 3C is a block diagram depicting yet another possible configuration of customer premises communications equipment.
Figure 3A:
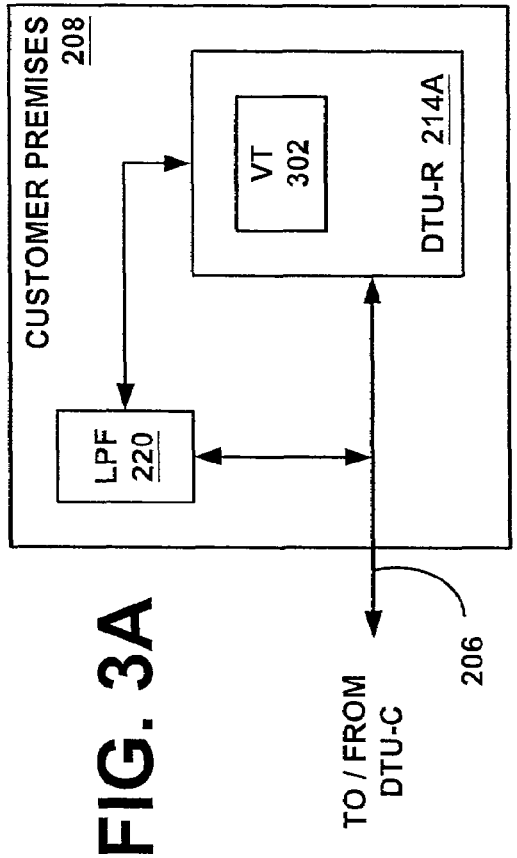
FIG. 3A is a block diagram depicting one possible configuration of customer premises communications equipment.
Figure 3B:
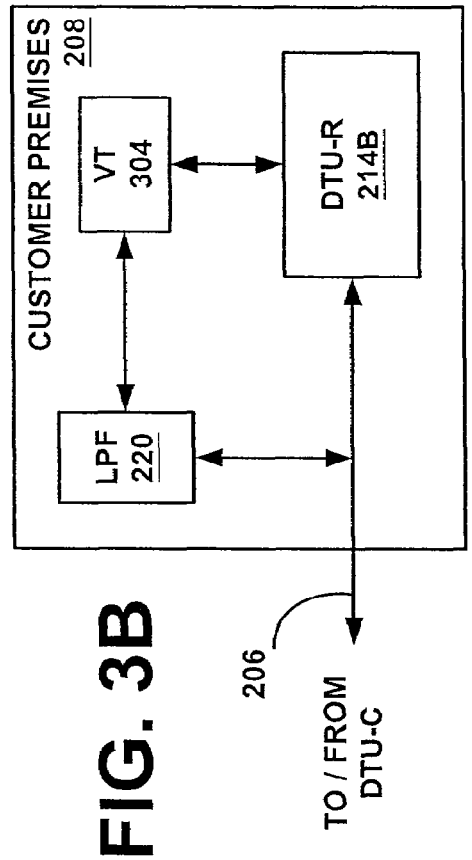
FIG. 3B is a block diagram depicting another possible configuration of customer premises communications equipment.

FIGS. 3A, 3B, and 3C are block diagrams depicting possible configurations of customer premises communications equipment. With reference to FIG. 3A, DTU-R 214A includes a very low frequency transceiver (VT) 302. VT 302 may be, for example, a voice-band modem, or a component that is capable of transmitting and receiving very low frequency (VLF) signals. As used herein, a VLF is a frequency that has a value between zero and 20 kHz. Therefore, a VLF signal may be, for example, a voice-band frequency signal, an audible frequency signal, or even a direct current (DC) signal.

With reference to FIG. 3B, DTU-R 214B is connected to a very low frequency modem (VT) 304 that can communicate using frequencies below 20 kHz. In one embodiment VT 304 may be a voice-band modem. As used herein, a voice-band modem is a modem that is capable of communicating using a frequency that is less than 4 kHz. Furthermore, VT 304 may be part of another device such as, for example, a personal computer.

With reference to FIG. 3C, a DTU-R 214C can communicate directly with a DTU-C (not shown) using VLF signals. The VLF signals may be, for example, voice-band spread spectrum modulated signals (VSSMS) or dual tone multi-frequency signals (DTMF). The advantage of VSSMS is that they may be used in such a way as to not disrupt plain old telephone service (POTS).

In each of the above examples, VLF signals may provide a DTU-C with data that can be used to diagnose a communication problem between the DTU-C and a respective DTU-R. In other embodiments of the invention, VLF signals may be used to initiate line-sounding tests, to download communications logic, to help install and/or configure a DTU-R 214, to determine a status of a DTU-R 214, and/or to retrieve data from a DTU-R 214.

II. System Components

The systems and methods of the present invention may be embodied in transceivers 104 and 108 in communication system 100 (FIG. 1) and in DTU-C 210 and DTU-R 214 in communication system 200 (FIG. 2). For ease of illustration, a single DTU-C 210 and a single DTU-R 214 will be described below. However, the following description is equally applicable to a system containing one or more central data transceiver units 210, each communicating with one or more remote data transceiver units 214 and to a system containing one or more transceivers 104 communicating with one or more transceivers 108.

Figure 4:
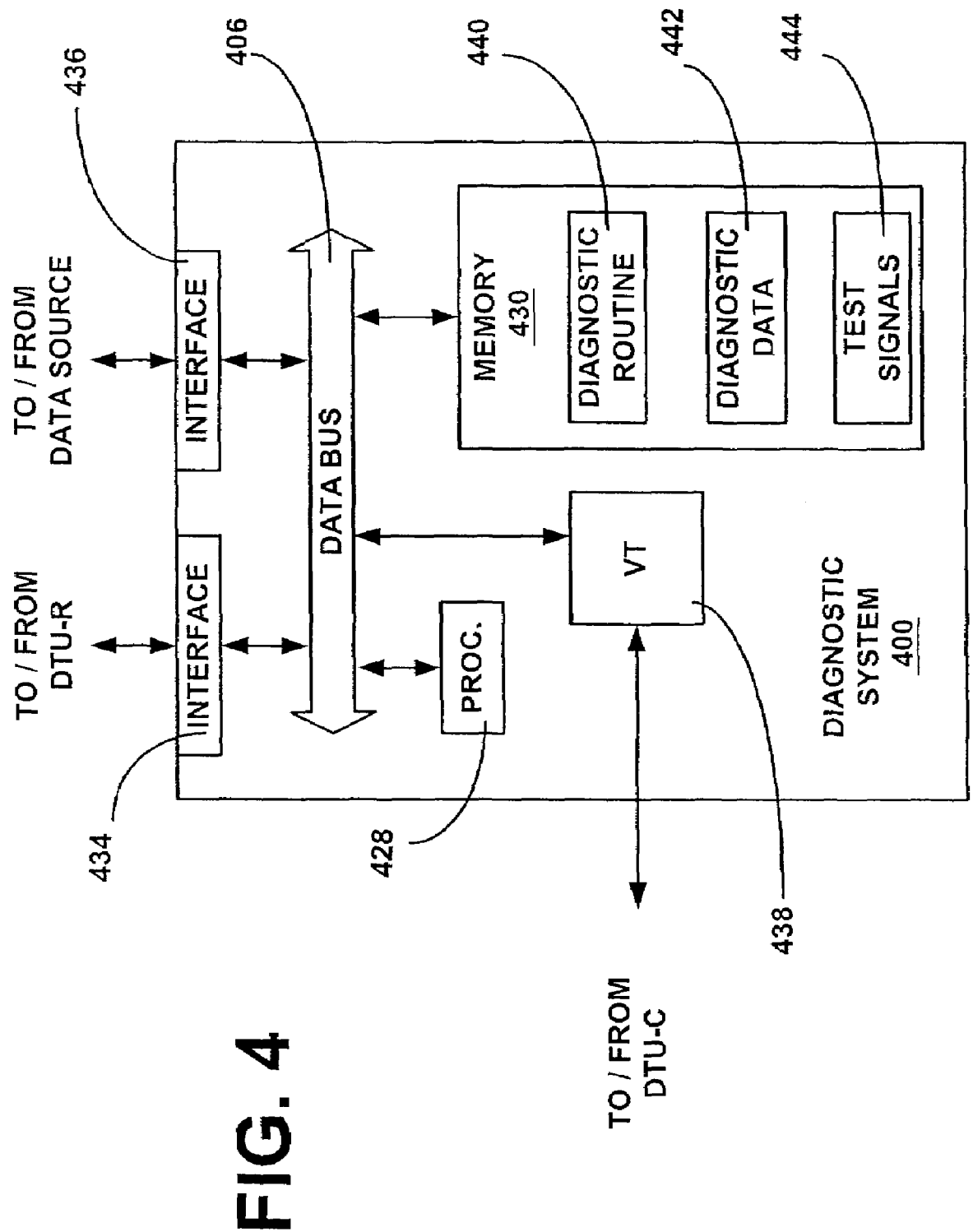
FIG. 4 is a block diagram illustrating one of a number of potential embodiments of a diagnostic system that can be used to help diagnose the cause of a communication problem in the communication system depicted in FIG. 2.

With additional reference to FIG. 2, FIG. 4 is a block diagram illustrating one of a number of potential embodiments of a diagnostic system (DS) 400 that can be connected to DTU-R 214 to help diagnose a communication problem between DTU-R 214 and DTU-C 210. DS 400 includes a data bus 406 that is coupled to the following components: microprocessor 428, memory 430, communication interface 434, communication interface 436, and a VLF transceiver (VT) 438. The VT 438 may be, for example, a voice-band modem. In an alternative embodiment, VT 438 may be located outside DS 400. Memory 430 and microprocessor 428 work in cooperation to store and execute diagnostic routine 440.

Execution of diagnostic routine 440 can result in the collection and storage of diagnostic data 442 and/or the transmission of test signals 444 over channel 206 via DTU-R 214. Diagnostic program 442 and test signals 444 may be stored in memory 430 before DS 400 is coupled to DTU-R 214 or may be downloaded via communication channel 206 using VT 438. Diagnostic data 442 is data that may be helpful in diagnosing the cause of a communication problem experienced by DTU-C 210 in communicating with DTU-R 214. Diagnostic data 442 may include, but is not limited to the following types of data: data that is based on test signals received by DTU-R 214 from DTU-C 210, data that is based on other messages received by DTU-R 214 from DTU-C 210, data that contains information about the status or configuration of the DTU-R 214, and/or data that contains information about the status or configuration of data source 216 in relation to DTU-R 214.

Figure 5:
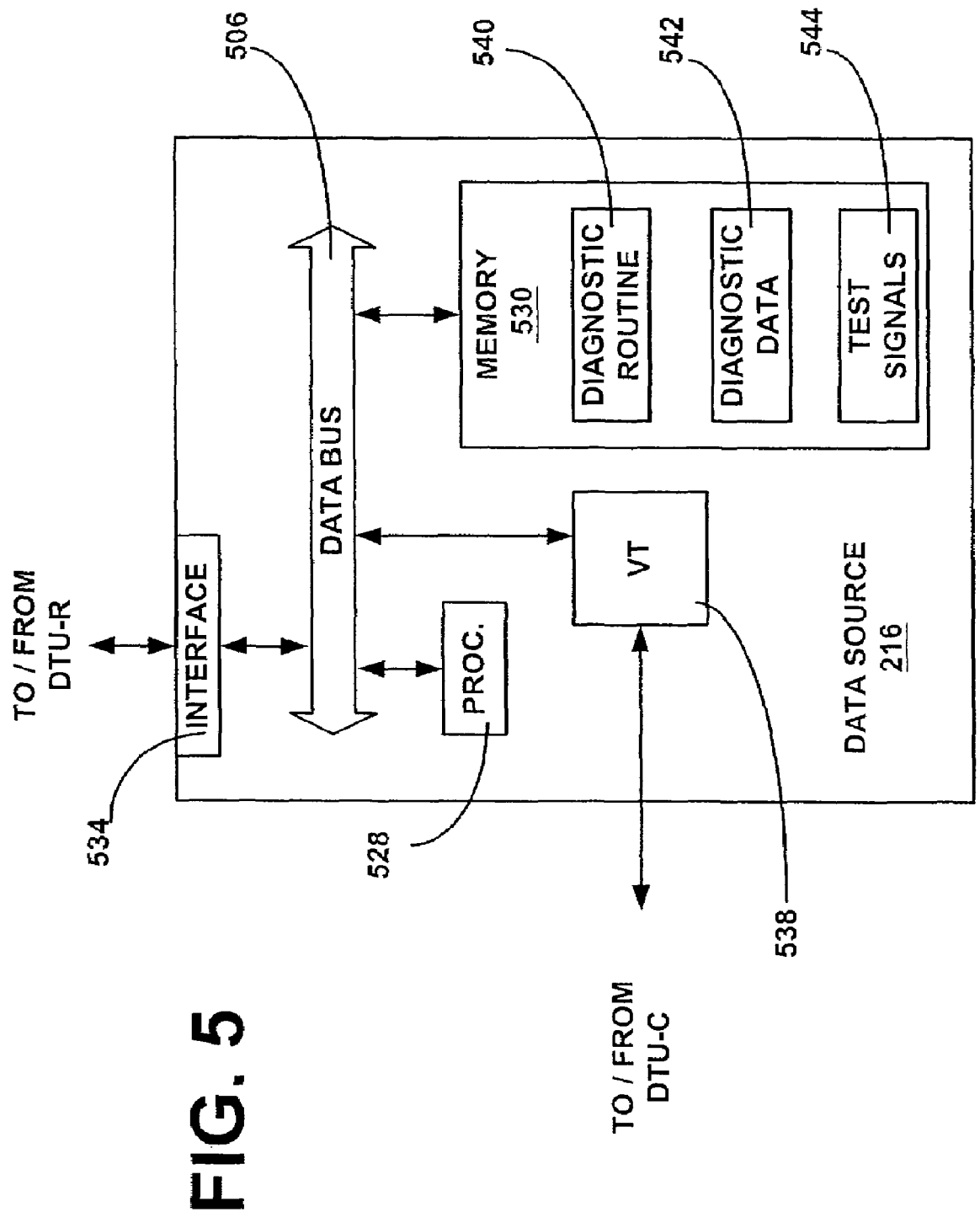
FIG. 5 is a block diagram illustrating a data source that is configured to implement an embodiment of the present invention.

FIG. 5 is a block diagram illustrating a data source 216 that is configured to implement an embodiment of the present invention. Data source 216 includes a data bus 506 that is coupled to a microprocessor 528, a memory 530, a communication interface 534, and a VLF transceiver (VT) 538. The VT 538 may be, for example, a voice-band modem. In an alternative embodiment, VT 538 is located outside data source 216. Memory 530 and microprocessor 528 work in cooperation to store and execute diagnostic routine 540.

Execution of diagnostic routine 540 can result in the collection and storage of diagnostic data 542 and/or the transmission of test signals 544 over channel 206 via DTU-R 214. Diagnostic program 542 and test signals 544 may be loaded onto data source 216 from a portable storage medium such as, for example, a diskette or a compact disc, or may be downloaded via communication channel 206 using VT 538.

Figure 6:
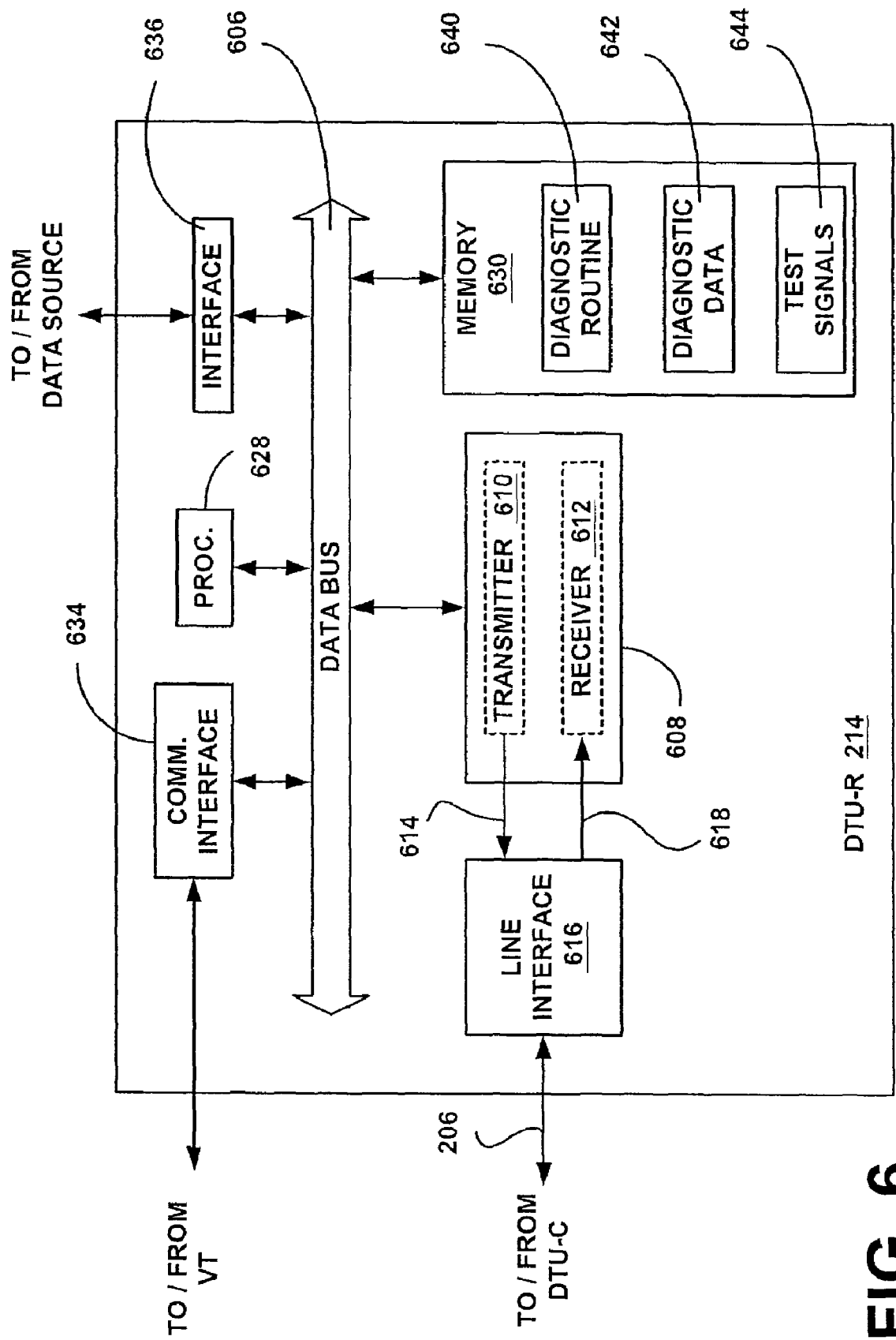
FIG. 6 is a block diagram illustrating one possible configuration of a remote data transceiver unit of the invention.

FIG. 6 is a block diagram illustrating one possible configuration of a DTU-R 214 of the invention. DTU-R 214 includes a data bus 606, a microprocessor 628, a memory 630, a communication interface 634 for interfacing with a VT (not shown), a communication interface 636 for interfacing with a data source (not shown), and a digital signal processor (DSP) 608 for transmitting and receiving DSL signals via line interface 616. Although DSP 608 as illustrated includes transmitter 610 and receiver 612, these components (610 & 612) may be implemented separately. Transmitter 610 transmits signals via connection 614 to line interface 616, and receiver 612 receives signals from line interface 616 via connection 618. Line interface 616 receives and transmits signals via communication channel 206.

Memory 630 and microprocessor 628 work in cooperation to store and execute diagnostic routine 640. Execution of diagnostic routine 640 can result in the collection and storage of diagnostic data 642 and/or the transmission of test signals 644 over channel 206 via DSP 608 and line interface 616. Diagnostic program 642 and test signals 644 may be downloaded via communication interface 634 using a VT (not shown), or may be pre-loaded onto memory 630 by a manufacturer or distributor of DTU-R 214.

Figure 7:
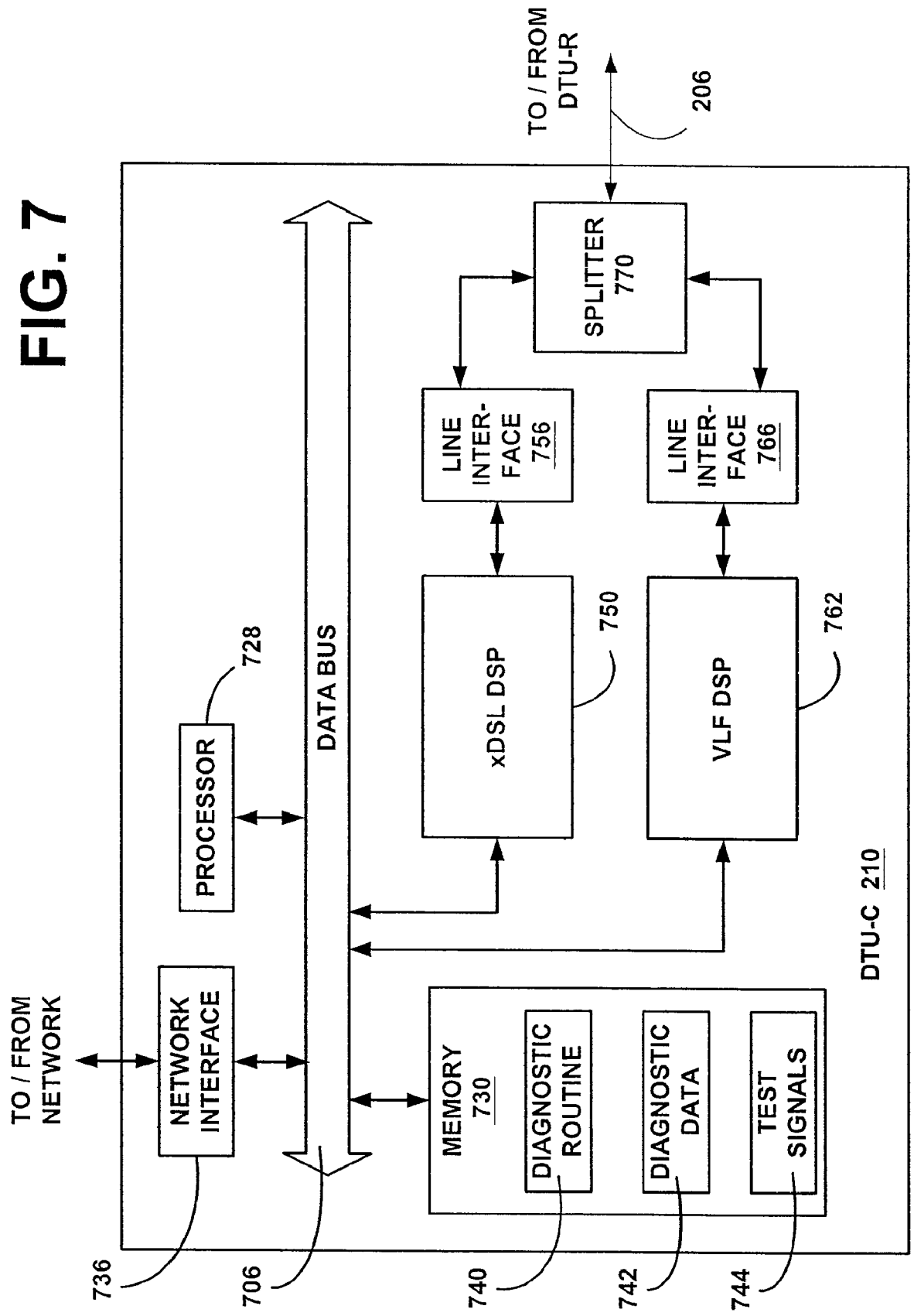
FIG. 7 is a block diagram illustrating one possible configuration of a central data transceiver unit of the invention.

FIG. 7 is a block diagram illustrating one possible configuration of a DTU-C 210 of the invention. DTU-C 210 includes a data bus 706, a microprocessor 728, a memory 730, a communication interface 736 for interfacing with a network (not shown), a DSP 750 for transmitting and receiving DSL signals via line interface 756, a DSP 762 for transmitting and receiving VLF signals via line interface 766, and a splitter 770 for separating and/or combining the VLF and DSL signals. Although DSPs 750 and 762 are illustrated separately, they may, in other embodiments, be combined into one component.

Memory 730 and microprocessor 728 work in cooperation to store and execute diagnostic routine 740. Execution of diagnostic routine 740 can result in the collection and storage of diagnostic data 742 and/or the transmission of test signals 744 over channel 206 via DSP 750. Diagnostic program 742 and test signals 744 may be received via communication interface 736 from a remote location, or may be pre-loaded onto memory 730 by a manufacturer or distributor of DTU-C 210.

III. System Functionality

Figure 8:
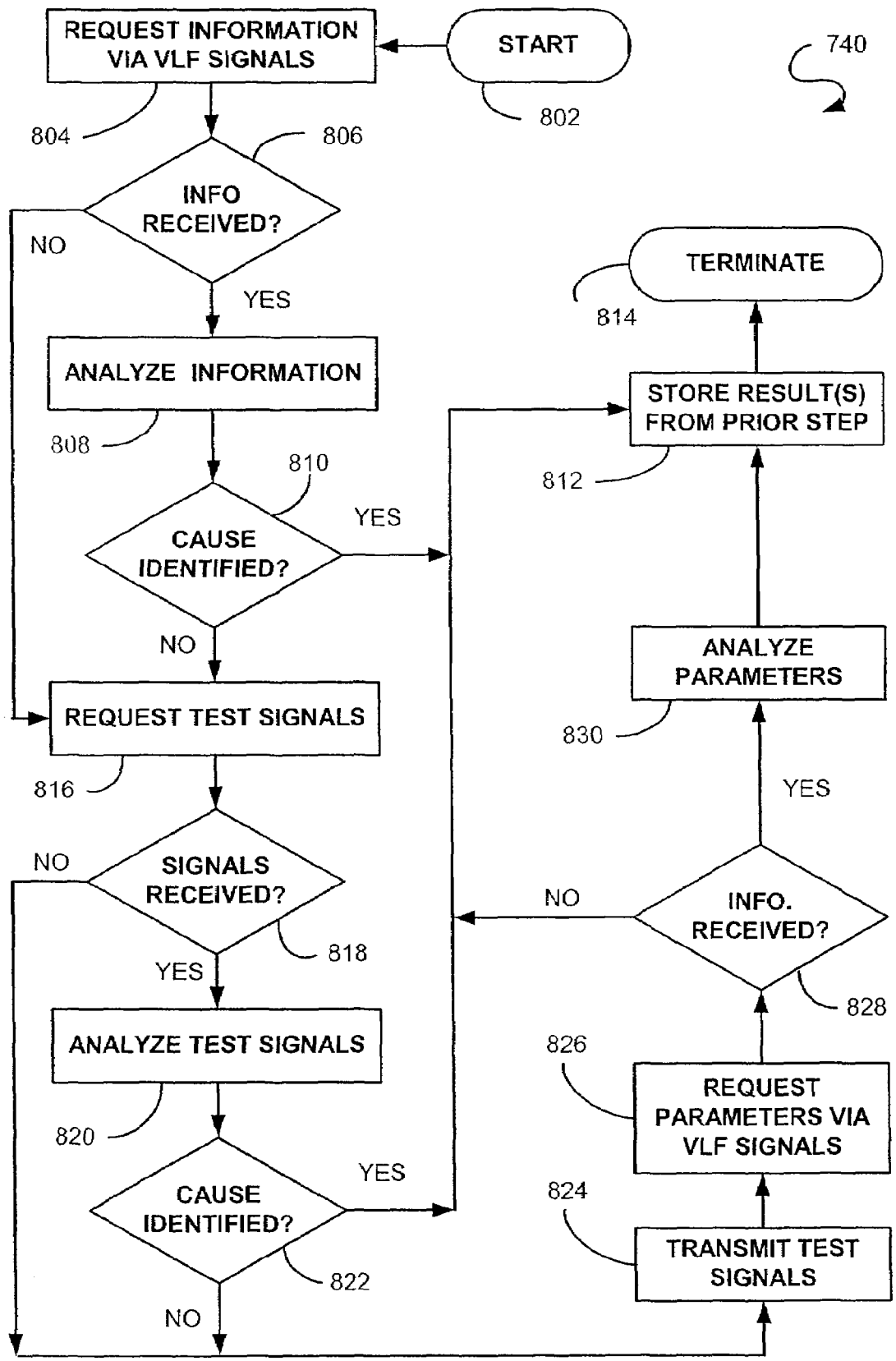
FIG. 8 is an exemplary flow chart illustrating one possible implementation of a diagnostic routine for diagnosing the cause of a communication problem in the communication system depicted in FIG. 2.

With additional reference to FIGS. 2 and 7, FIG. 8 illustrates one possible configuration of a diagnostic routine 740 for diagnosing the cause of a communication problem between DTU-C 210 and DTU-R 214. Diagnostic routine 740 may be executed, for example, by processor 728 in DTU-C 210.

After the diagnostic routine is initiated, as depicted by step 802, DTU-C 210 requests diagnostic information from DS 400 using VLF signals, as depicted by step 804. The diagnostic routine may be initiated, for example, if train-up of the DTU-R 214 is unsuccessful. VLF frequencies are used since the subscriber loop may be unfit for DSL communication, as evidenced by the existence of a communication problem. The diagnostic information requested may include, for example, whether DTU-R 214 had received any messages from DTU-C 210, how DTU-R 214 is currently configured, whether DTU-R 214 is properly connected to channel 206, and whether, if applicable, data source 216 contains the software necessary to drive DTU-R 214. DS 400 then retrieves the requested information from DTU-R 214 and/or data source 216 and transmits it to DTU-C 210. If DS 400 is unable to retrieve any of the requested information then DS 400 would also report this to DTU-C 210.

After a predetermined period of time, DTU-C 210 determines whether any of the requested information was received from DS 400, as depicted by step 806. If such information was not received by DTU-C 210 from DS 400, then processor 728 proceeds to execute step 816. However, if any of the requested information was received by DTU-C 210 from DS 400, then DTU-C 210 analyzes the information as depicted by step 808. After the response is analyzed, DTU-C 210 determines, as depicted by step 810, if there is an apparent cause for the communication problem between DTU-C 210 and DTU-R 214. If an apparent cause is identified, then DTU-C 210 stores this result in memory 730 as depicted by step 812 and the routine terminates, as depicted by step 814. However, if an apparent cause of the communication problem is not identified, then DTU-C 210 sends a message using VLF signals to DTU-R 214 via DS 400, requesting that DTU-R 214 transmit DSL test signals, as depicted by step 816. The test signals may test for various conditions and/or system parameters including, for example, proper operation of a multiple virtual line (MVL) modulation scheme, presence of loading coils, presence of a POTS splitter, POTS activity, presence of an LPF, POTS interference, non-linear distortion, noise levels, crosstalk levels, tonal interference, and data transmission rates.

After requesting that DTU-R 214 transmit test signals, DTU-C 210 checks to determine if test signals were received from DTU-R 214, as depicted by step 818. If test signals are not received, then processor 728 proceeds to execute step 824. However, if test signals are received, then DTU-C 210 analyzes the received test signals, as depicted by step 820, and determines whether an apparent cause of the communication problem can be identified, as depicted by step 822.

If an apparent cause of the communication problem is identified, then DTU-C 210 stores this result (the cause of the communication problem) in memory, as indicated in step 812, and the routine terminates, as depicted by step 814. If a cause of the problem is not identified, then the DTU-C 210 transmits DSL test signals to the DTU-R 214, as depicted by step 824. After transmitting the test signals, DTU-C 210 sends a message via VLF signals to DS 400 requesting that parameters of the DSL test signals received by DTU-R 214 be transmitted back to DTU-C 210 via VLF signals, as depicted by step 826. The parameters may provide information such as, for example, whether something tested for was present (POTS, loading coils, splitter, LPF, etc) and/or the extent of any distortion, noise, interference or crosstalk that was detected in the test signals.

After a predetermined time, DTU-C 210 then determines whether the requested parameters were received from DS 400, as depicted by step 828. If the parameters were received, then the DTU-C 210, as depicted by step 830, analyzes the parameters in order to determine an apparent cause of the communication problem. DTU-C 210 then stores the results of the analysis in memory 730, as depicted by step 812. If DTU-C 210 does not receive the requested parameters within a predetermined period of time, then DTU-C 210 stores this result (that the requested parameters were not received) into memory 730 and the routine terminates as depicted by step 814.

Figure 9:
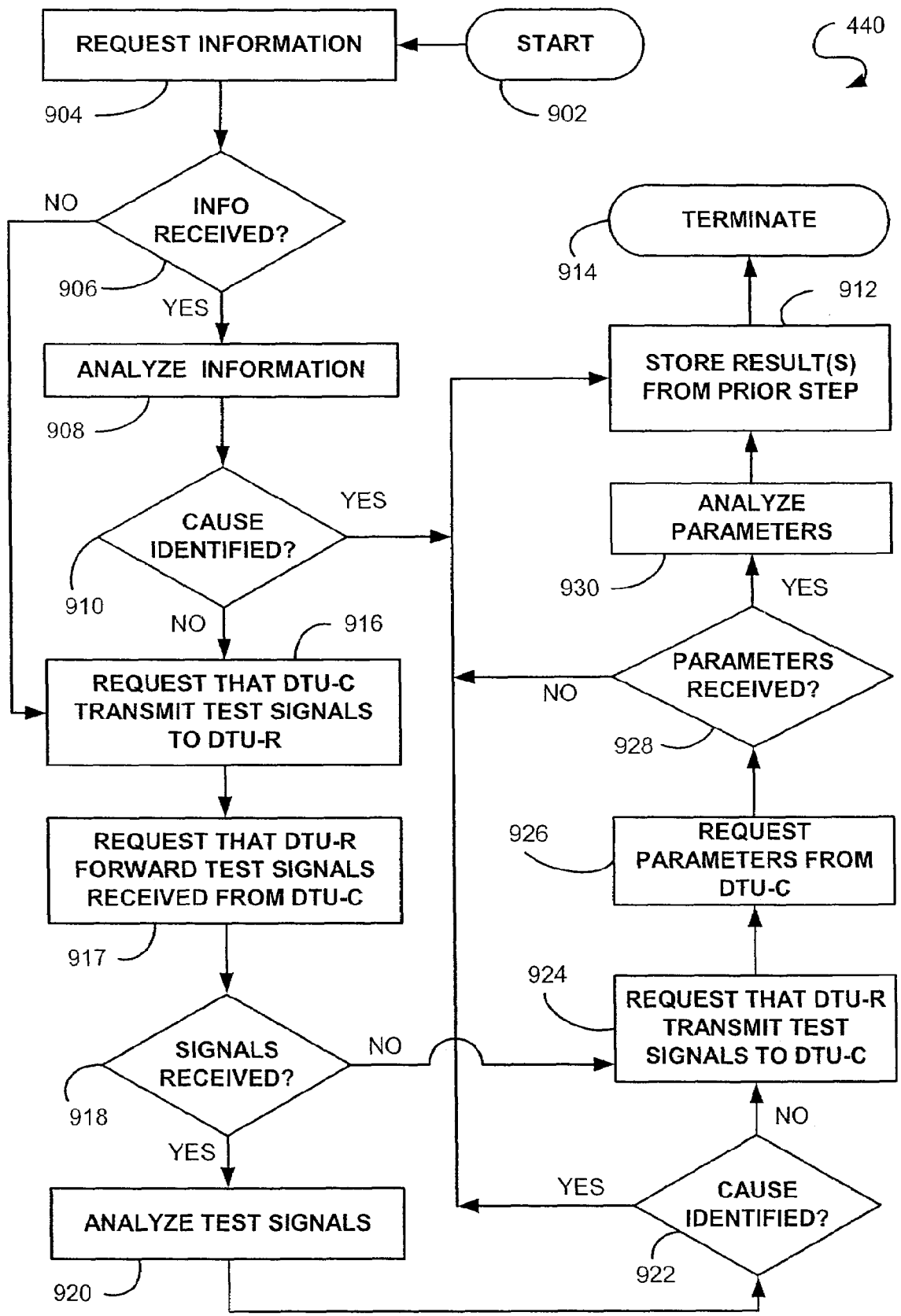
FIG. 9 is a flow chart illustrating one possible implementation of a diagnostic routine for diagnosing the cause of a communication problem in the communication system depicted in FIG. 2.

With additional reference to FIGS. 2 and 4, FIG. 9 illustrates one possible configuration of diagnostic routine 440 for diagnosing the cause of a communication problem between DTU-C 210 and DTU-R 214. Diagnostic routine 440 is executed by processor 428 in DS 400. After the diagnostic routine 440 is initiated, as depicted by step 902, DS 400 requests diagnostic information from DTU-R 214, data source 216 (if applicable), and DTU-C 210, as depicted by step 904. The diagnostic routine may be initiated, for example, if train-up of the DTU-R 214 is unsuccessful. If information is requested from DTU-C 210, then the request may be transmitted via VLF signals. VLF frequencies are used since the subscriber loop may be unfit for DSL communication, as evidenced by the existence of a communication problem. The information that DS 400 requests may include, for example, the "address" that DTU-R 214 uses to contact DTU-C 210, the communication protocols being used by DTU-R 214 and DTU-C 210 to communicate together, system settings for DTU-R 214, communication settings for data source 216, and the communication software installed on data source 216 for driving DTU-R 214.

After a pre-determined period of time, DS 400 checks to see if it has received any of the information that it had requested, as depicted by step 906. If DS 400 did not receive any of the information that it had requested, then the processor 428 proceeds to execute step 916. However, if DS 400 receives some or all of the information that it had requested, then it analyzes the information, as depicted by step 908, and determines whether a cause of the communication problem can be identified, as depicted by step 910. If a cause is identified, then DS 400 stores this result in memory 430, as depicted by step 912, and the routine terminates as depicted by step 914. However, if a cause is not identified, then, as depicted by step 916, DS 400 transmits a VLF message to DTU-C 210 requesting that DTU-C 210 transmit test signals to DTU-R 214. The test signals may be, for example, of the type indicated above with respect to flow chart 800. DS 400 then requests that DTU-R 214 forward to DS 400 test signals received from DTU-C 210, as depicted by step 917.

After a predetermined time period, DS 400 determines, as depicted by step 918, whether any test signals were forwarded by DTU-R 214. If no test signals were forwarded, then the processor 428 proceeds to execute step 924. If test signals are forwarded to DS 400 from DTU-R 214, then DS 400 analyzes the test signals, as depicted by step 920, and determines whether a cause can be identified for the communication problem, as depicted by step 922. If a cause for the problem can be identified, then this result (the cause) is stored in memory 430, as depicted by step 912, and the routine terminates, as depicted by step 914. However, if a cause for the problem is not identified, then DS 400 transmits a message to DTU-R 214 requesting that DTU-R 214 transmit test signals to DTU-C 210, as depicted by step 924. DS 400 then sends a VLF message to DTU-C 210, as depicted by step 926, requesting that DTU-C 210 transmit to DS 400 parameters from the test signals received by DTU-C 210 from DTU-R 214. The parameters from the test signals may be, for example, of the type indicated above with respect to flow chart 800.

DS 400 then determines if it has received from DTU-C 210 the parameters from the test signals transmitted by DTU-R 214, as depicted by step 928. If the parameters are received by DS 400 within a predetermined time period, then DS 400 analyzes the parameters, as depicted by step 930, and stores the result of the analysis in memory 430 as depicted by step 912. If DS 400 does not receive the parameters, then DS 400 stores an indication to that effect in memory 430 as indicated in step 912, and the routine terminates as depicted by step 914.

Any blocks or steps shown in FIGS. 8 and 9 represent modules, segments, or portions of code which include one or more executable instructions for implementing specific logical functions or steps in a process. Alternate implementations are included within the scope of the preferred embodiment of the present invention in which functions or steps may be executed out of order from that shown or discussed, including substantially concurrently or in reverse order, depending on the functionality involved, as would be understood by those reasonably skilled in the art. Furthermore, in some embodiments of the invention, only a subset of the blocks or steps shown in FIG. 8 or FIG. 9 may be implemented.

It will also be appreciated by those skilled in the art that the functionality provided by each of the routines illustrated in FIGS. 8 and 9, can also be implemented through hardware (e.g., an application specific integrated circuit (ASIC) and supporting circuitry). Each implementation has its advantages, however. For example, hardware enjoys a speed and, arguably, a reliability advantage over software because hardware testing and verification methods are currently more advanced than software verification methods. On the other hand, software can be less expensive than customized hardware and offers greater flexibility in adding or modifying product features.

Further, the functionality provided by each of the routines illustrated in FIGS. 8 and 9, can be embodied in any computer-readable medium for use by or in connection with a computer-related system (e.g., an embedded system such as a modem) or method. In this context of this document, a computer-readable medium is an electronic, magnetic, optical, semiconductor, or other physical device or means that can contain or store a computer program or data for use by or in connection with a computer-related system or method. Also, the computer program or data may be transferred to another computer-readable medium by any suitable process such as by scanning the computer-readable medium. Thus, the computer-readable medium could be paper or other suitable medium upon which the computer program can be printed, scanned with an optical scanner, and transferred into the computer's memory or storage.

While various embodiments of the invention have been described, it will be apparent to those of ordinary skill in the art that many more embodiments and implementations are possible that are within the scope of this invention.

What we claim is:

1. A diagnostic system for diagnosing a communication problem between local and remote xDSL modems, the system comprising:
    a first interface for communicating with the local xDSL modem;
    a very-low-frequency (VLF) modem for communicating with the remote xDSL modem using frequencies within the range of 0-20 kHz; and
    a processor,
    wherein the processor is configured to, responsive to receiving notification of a communication problem between the local and remote xDSL modems, request diagnostic information from the remote xDSL modem via the VLF modem.

2. The diagnostic system of claim 1, wherein the VLF modem is configured to communicate using voice-band spread spectrum modulated signals.

3. The diagnostic system of claim 1, wherein the processor is further configured to:
    receive, via the VLF modem, requested diagnostic data from the remote xDSL modem; and
    determine the cause of the communication problem using the received diagnostic data.

4. The diagnostic system of claim 1, wherein the processor is further configured to:
    transmit a request, via the VLF modem, to the remote xDSL modem for the remote xDSL modem to transmit a plurality of xDSL test signals to the local xDSL modem.

5. The diagnostic system of claim 4, wherein the processor is further configured to:
    request, via the first interface, that the local xDSL modem communicate the received xDSL test signals to the diagnostic system; and
    receive and analyze the test signals to determine the cause of the communication problem.

6. The diagnostic system of claim 1, wherein the processor is further configured to:
    request that the local xDSL modem transmit a plurality of xDSL test signals to the remote xDSL modem.

7. The diagnostic system of claim 6, wherein the processor is further configured to:
    instruct the remote xDSL modem, via the VLF modem, to communicate the received xDSL test signals to the diagnostic system; and
    receive and analyze the test signals to determine the cause of the communication problem.

8. The diagnostic system of claim 1, further comprising a second interface for communicating with a data source.

9. The diagnostic system of claim 1, wherein the notification is received from the local xDSL modem.

10. The diagnostic system of claim 1, wherein the VLF modem is configured to communicate using dual-tone multi-frequency signals.

11. The diagnostic system of claim 1, wherein the VLF modem communicates with the remote xDSL modem using frequencies less than 4 kHz.

12. A diagnostic system for diagnosing a communication problem between local and remote xDSL modems, the system comprising:
    first xDSL communication means for communicating with the remote xDSL modem using frequencies within the range of 0-20 kHz; and
    information retrieval means, responsive to receiving notification of a communication problem between the local and remote xDSL modems, for requesting diagnostic information relating to the communication problem from the remote xDSL modem via the first xDSL communication means.

13. The diagnostic system of claim 12, further comprising means for receiving requested diagnostic data from the remote xDSL modem via the first xDSL communication means.

14. The diagnostic system of claim 12, further comprising a second xDSL communication means for communicating with the local xDSL modem; and
    wherein the information retrieval means further comprises means, responsive to receiving notification of the communication problem between the local and remote xDSL modems, for requesting second diagnostic information relating to the communication problem from the local xDSL modem via the second xDSL communication means,
    wherein the second diagnostic data comprises at least one of a status and a configuration of the local xDSL modem.

15. The diagnostic system of claim 14, wherein the second diagnostic data further comprises at least one of communication settings of the local xDSL modem, and information about communication software residing on a data source associated with the local xDSL modem.

16. The diagnostic system of claim 14, wherein the second diagnostic data comprises configuration parameters for the local xDSL modem.

17. The diagnostic system of claim 14, wherein the second diagnostic data comprises at least one of a remote xDSL modem address and information about a communication protocol used between the local xDSL modem and the remote xDSL modem.

18. The diagnostic system of claim 12, further comprising a means for communicating with a data source.

19. The diagnostic system of claim 12, further comprising a second xDSL communication means for communicating with the local xDSL modem,
    wherein the notification is received from the local xDSL modem.

20. The diagnostic system of claim 19, wherein the information retrieval means further comprises means, responsive to receiving notification of the communication problem between the local and remote xDSL modems, for requesting second diagnostic information relating to the communication problem from the local xDSL modem via the second xDSL communication means.

21. The diagnostic system of claim 12, wherein the first xDSL communication means is configured to communicate using voice-band spread spectrum modulated signals.

22. The diagnostic system of claim 12, wherein the first xDSL communication means communicates with the remote xDSL modem using frequencies less than 4 kHz.

23. A method for diagnosing an xDSL communication problem between local and remote xDSL modems, the method comprising:

receiving at a diagnostic system, a notification from the local xDSL modem in response to communication between the local xDSL modem and remote xDSL modem experiencing a communication problem; and in response to the notification, the diagnostic system exchanging diagnostic data with the remote xDSL modem using frequencies above 0 kHz and below 20 kHz, the diagnostic data relating to a cause of the communication problem.

24. The method of claim 23, further comprising:

requesting, using frequencies above 0 kHz and below 20 kHz, at least a portion of the diagnostic data from the remote xDSL modem;

receiving, using frequencies above 0 kHz and below 20 kHz, the requested diagnostic data; and analyzing the received diagnostic data to determine the cause of the communication problem.

25. The method of claim 23, further comprising:

transmitting a request, using frequencies above 0 kHz and below 20 kHz, to the remote xDSL modem for the remote modem to transmit a plurality of xDSL test signals to the local xDSL modem.

26. The method of claim 25, further comprising:

instructing the local xDSL modem to communicate the received xDSL test signals to the diagnostic system; and analyzing the test signals to determine the cause of the communication problem.

27. The method of claim 26, wherein the xDSL test signals are used to determine at least one of a loading coil on the subscriber loop, a POTS splitter on a subscriber loop, POTS activity on a subscriber loop, presence of a low pass filter on a subscriber loop, POTS interference, non-linear distortion, noise levels, crosstalk levels, tonal interference, and data transmission rates.

28. The method of claim 23, further comprising:

requesting the local xDSL modem to transmit a plurality of xDSL test signals to the remote xDSL modem.

29. The method of claim 28, further comprising:

instructing the remote xDSL modem, using frequencies above 0 kHz and below 20 kHz, to communicate the received xDSL test signals to the diagnostic system; and analyzing the test signals to determine the cause of the communication problem.

30. The method of claim 23, wherein the diagnostic system communicates with the remote xDSL modem using frequencies above 0 kHz and below 20 kHz using voice-band spread spectrum modulated signals.

31. The method of claim 23, wherein the diagnostic system exchanges diagnostic data with the remote xDSL modem using frequencies below 4 kHz.

32. An article of manufacture including a computer readable medium having instructions stored thereon that, in response to execution by a computing device, cause the computing device to perform operations comprising:

receiving notification from a local xDSL modem in response to communication between the local xDSL modem and a remote xDSL modem experiencing a communication problem; and in response to the notification, exchanging diagnostic data with the remote xDSL modem using frequencies above 0 kHz and below 20 kHz, the diagnostic data related to a cause of the communication problem.

33. The article of manufacture of claim 32, wherein the operations further comprise:

requesting, using frequencies above 0 kHz and below 20 kHz, at least a portion of the diagnostic data from the remote xDSL modem;

receiving, using frequencies above 0 kHz and below 20 kHz, the requested diagnostic data; and analyzing the received diagnostic data to determine the cause of the communication problem.

34. The article of manufacture of claim 32, wherein the operations further comprise:

transmitting a request, using frequencies above 0 kHz and below 20 kHz, to the remote xDSL modem for the remote modem to transmit a plurality of xDSL test signals to the local xDSL modem.

35. The article of manufacture of claim 34, wherein the operations further comprise:

instructing the local xDSL modem to communicate the received xDSL test signals to the diagnostic system; and analyzing the test signals to determine the cause of the communication problem.

36. The article of manufacture of claim 32, wherein the operations further comprise:

requesting the local xDSL modem to transmit a plurality of xDSL test signals to the remote xDSL modem.

37. The article of manufacture of claim 36, wherein the operations further comprise:

instructing the remote xDSL modem, using frequencies above 0 kHz and below 20 kHz, to communicate the received xDSL test signals to the diagnostic system; and analyzing the test signals to determine the cause of the communication problem.

38. The article of manufacture of claim 32, wherein the operations further comprise:

exchanging the diagnostic data with the remote xDSL modem using frequencies below 4 kHz.

39. An article of manufacture including a computer readable medium having instructions stored thereon that, in response to execution by a computing device, cause the computing device to perform operations comprising:

receiving notification of a communication problem between a local xDSL modem and a remote xDSL modem;

responsive to receiving the notification, requesting diagnostic information from the remote xDSL modem via a very-low-frequency (VLF) modem coupled to the remote xDSL modem, the VLF modem communicating using frequencies above 0 kHz and below 20 kHz.

40. The article of manufacture of claim 39, wherein the operations further comprise:

receiving, via the VLF modem, requested diagnostic data from the remote xDSL modem; and determining the cause of the communication problem using the received diagnostic data.

41. The article of manufacture of claim 39, wherein the operations further comprise:

transmitting a request, via the VLF modem, to the remote xDSL modem for the remote xDSL modem to transmit a plurality of xDSL test signals to the local xDSL modem.

42. The article of manufacture of claim 41, wherein the operations further comprise:

requesting that the local xDSL modem communicate the received xDSL test signals to the diagnostic system; and receiving and analyzing the test signals to determine the cause of the communication problem.

43. The article of manufacture of claim 39, wherein the operations further comprise:
requesting that the local xDSL modem transmit a plurality of xDSL test signals to the remote xDSL modem.

44. The article of manufacture of claim 43, wherein the operations further comprise:
instructing the remote xDSL modem, via the VLF modem, to communicate the received xDSL test signals to the diagnostic system; and
receiving and analyzing the test signals to determine the cause of the communication problem.

45. The article of manufacture of claim 39, wherein the operations further comprise:
requesting the diagnostic information from the remote xDSL modem via the very-low-frequency (VLF) modem coupled to the remote xDSL modem, the VLF modem communicating using frequencies above below 4 kHz.

* * * * *